United States Patent [19]

Kubo et al.

[11] Patent Number: 4,618,926
[45] Date of Patent: Oct. 21, 1986

[54] BUFFER STORAGE CONTROL SYSTEM

[75] Inventors: Kanji Kubo, Hadano; Kenichi Wada, Zama; Yooichi Shintani, Kokubunji, all of Japan

[73] Assignee: Hitachi, Ltd., Tokyo, Japan

[21] Appl. No.: 518,698

[22] Filed: Jul. 29, 1983

[30] Foreign Application Priority Data

Sep. 10, 1982 [JP] Japan .............................. 57-156634

[51] Int. Cl.[4] .......................... G06Z 9/38; G06Z 9/34
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,829,840 | 8/1974 | Burk et al. | 364/200 |
| 3,992,702 | 11/1976 | Bailey | 364/200 |
| 4,056,844 | 11/1977 | Izumi | 364/900 |
| 4,149,239 | 4/1979 | Jenkins et al. | 364/200 |
| 4,149,242 | 4/1979 | Pirz | 364/200 |
| 4,339,804 | 7/1982 | Davison et al. | 364/900 |
| 4,424,561 | 1/1984 | Stanley et al. | 364/200 |
| 4,471,429 | 9/1984 | Porter et al. | 364/200 |
| 4,481,573 | 11/1984 | Fukunaga et al. | 364/200 |
| 4,493,026 | 1/1985 | Olnowich | 364/200 |
| 4,493,033 | 1/1985 | Ziegler et al. | 364/200 |
| 4,502,110 | 2/1985 | Saito | 364/200 |

Primary Examiner—James D. Thomas
Assistant Examiner—Thomas Lee
Attorney, Agent, or Firm—Antonelli, Terry & Wands

[57] ABSTRACT

In a storage hierarchy system, a part of data stored in a main storage in held as a copy by a buffer storage of a smaller capacity and higher speed than the main storage. A processor fetches data from the buffer storage or stores data in the buffer storage at a high speed. A buffer storage control system includes a first buffer directory and a second buffer directory. The first buffer directory and the buffer storage are accessed by an address for a fetch request, while the second buffer directory and the buffer storage are accessed by an address for store request, whereby competition for the access to the buffer storage between the fetch and store operations is reduced.

22 Claims, 4 Drawing Figures

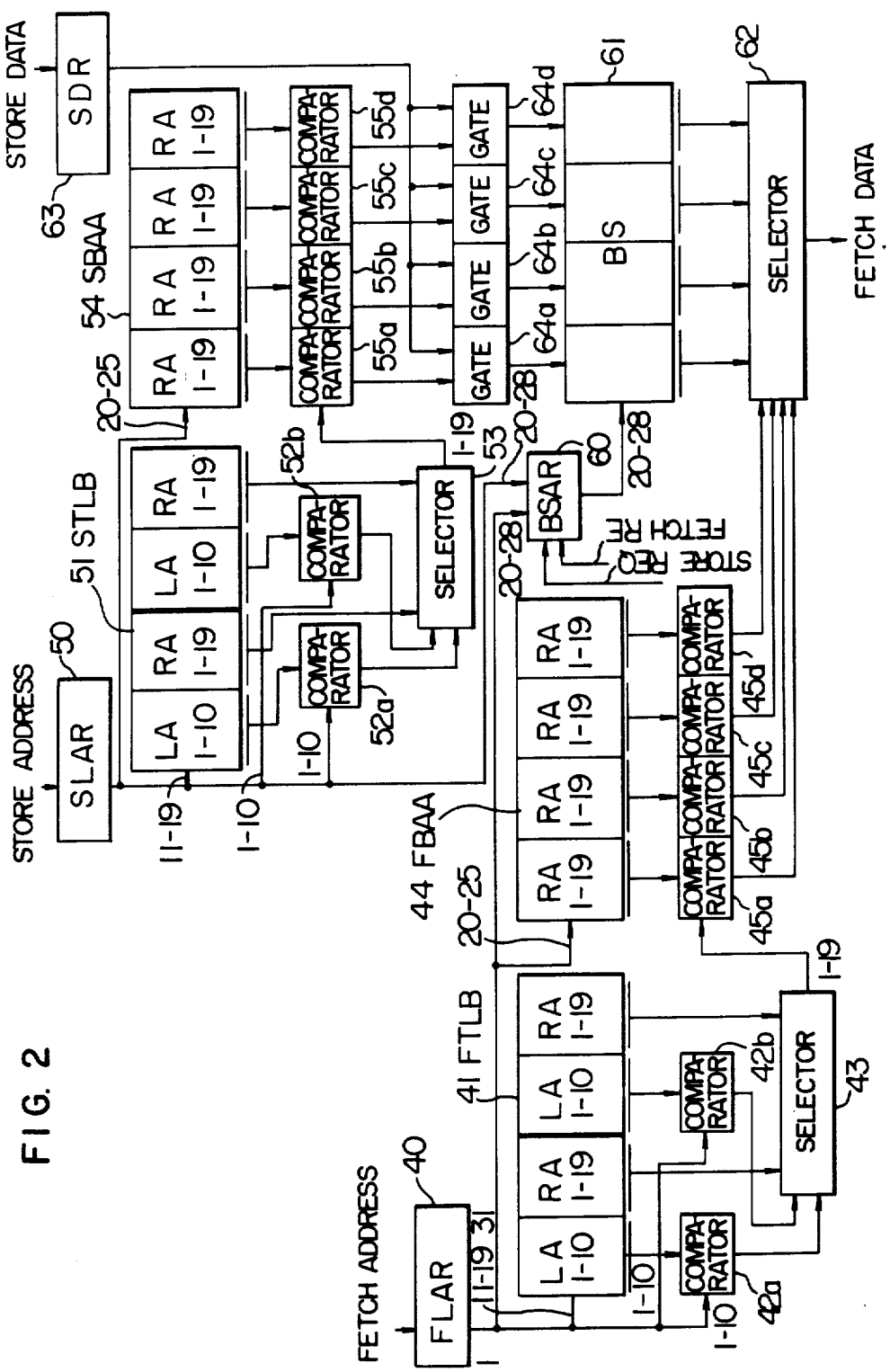

BUFFER STORAGE CONTROL SYSTEM

The present invention relates to a buffer storage control system in a data processing system having a buffer storage.

In the data processing system provided with a buffer storage, the latter is realized in a smaller capacity and operated at a higher speed than a main storage, so that a part of data held in the main storage and utilized at a high frequency is stored in the buffer storage to be used at a high speed. Addresses of the data held by the buffer storage are stored in a buffer directory which serves to indicate whether the data of an address to which an access request is issued is present or not in the buffer storage. Further, in a data processing system of the virtual address type, there is provided an address translation buffer for holding translation pairs each consisting of a logical address and a corresponding real address. When an access request is issued by designating a logical address, the corresponding real address is determined by the address translation buffer, while the buffer directory is searched to determine if the data of the address to which the access request is issued is present in the buffer storage. If the data in concern is found to be present, the buffer storage is accessed to fetch or store data as required. Techniques for accessing the address translation buffer, the buffer directory and the buffer storage are disclosed for example in U.S. Pat. No. 3,761,881 (issued Sept. 25, 1973), Japanese Laid-open patent application No. 10638/1974.

On the other hand, in the case of a data processing system in which a pipeline architecture is adopted, processing for a single instruction is divided into a plurality of steps with each of the steps in turn being processed through a plurality of stages which can be activated independent of one another, so that a plurality of instructions can be simultaneously processed.

A typical example of the pipelined data processing system is illustrated in FIG. 1 of the accompanying drawings, in which cycles are taken along the abscissa. In this figure, a reference letter I represents an instruction fetch, $A_i$ represents accesses made to the address translation buffer and the buffer directory by the instruction fetch I, $L_i$ represents an access to the buffer storage made by the instruction fetch I, D represents a decoding cycle, A represents accesses made to the address translation buffer and the buffer directory by an operand fetch, L represents an access to the buffer storage by the operand fetch, E represents an instruction execution cycle (during which the address translation buffer and the buffer directory are accessed for storing in the case of a store instruction), P represents a transfer cycle for the result of the execution and S represents a store cycle for the buffer storage. As will be seen in FIG. 1, a single instruction is processed through nine steps in the case of the illustrated example, although the number of the steps is never restricted to nine, needless to say. It will be noted that the access to the address translation buffer, the buffer directory and the buffer storage is issued three times for the instruction fetch, the operand fetch and the store operation, respectively, in the course of execution of a single instruction. Under the circumstance, these accesses have to be protected from competition with one another. To this end, there has been proposed a system in which the address translation buffer, the buffer directory and the buffer storage are divisionally and separately provided for the instruction fetch and the operand fetch, respectively, so that they can be accessed independent of one another. For example, U.S. Pat. No. 3,618,041 (issued Nov. 2, 1971) discloses a memory control system in which the buffer directory and the buffer storage are divisionally and separately provided for the instruction fetch and the operand fetch, respectively, so as to be accessed independent of each other. With such arrangement, any conflict or competition between the accesses for the instruction fetch and the operand fetch can certainly be avoided. However., it is impossible in this known system to avoid the competition in access between the store operation and the instruction fetch operation on one hand and between the store operation and the operand fetch operation on the other hand.

Referring to FIG. 1, it is assumed that instruction 1 is a store instruction and that instructions 2 to 10 are load instructions. On this assumption, the accesses to the address translation buffer and the buffer directory for the store operation are simultaneously issued at the stage E of the instruction 1 in the cycle 6. As a consequence, they compete with the accesses to the address translation buffer and the buffer directory made for the operand fetch issued at the stage A of the instruction 3 and the instruction fetch issued at the stage $A_i$ of the instruction 6, both stages A and $A_i$ belonging to the same cycle 6. Besides, since the writing in the buffer storage is commanded by the store instruction 1 at the stage S thereof in the cycle 8, the access to the buffer storage for realizing the store instruction 1 will compete with the accesses for reading from the buffer storage in response to the operand fetch issued at the stage L of the instruction 4 and the instruction fetch making appearance at the stage $L_i$ of the instruction 7, both stages coinciding with the same cycle 8.

As will be obvious from the above elucidation, even when the address translation buffer, the buffer directory and the buffer storage are provided separately for the instruction fetch and the operand fetch, respectively, competition of accesses will occur between the cycle or stage E of the store instruction and the cycles A and $A_i$ of the load instruction on one hand and between the cycle S of the store instruction and the cycles L and $L_i$ of the load instructions on the other hand. In this way, there remains room for improving the processing capability of the pipelined system for the store instruction.

It is an object of the present invention to provide a storage control system which is capable of reducing competition for the access.

Another object of the present invention is to provide a buffer storage control system in which competition for the access to a buffer directory between fetch and store instructions is removed or at least mitigated.

A further object of the present invention is to provide a buffer storage control system in which competition between the fetch and store instructions for the access to an address translation buffer and a buffer directory is removed or at least mitigated.

In view of above and other objects which will become apparent as description proceeds, there is provided according to an aspect of the present invention a storage control system which comprises buffer storage means for holding data, first register means in which an address required for realizing a fetch request to the buffer storage is set or placed, second register means in which an address required for a store request is set, and third register means in which data for a store operation are set. Further, the storage control system includes first buffer directory means and second buffer directory means. The first buffer directory means is supplied with the address from the first register means and indicates whether or not data designated by said address is held by th buffer storage means. The second buffer directory means is supplied with the address from the second register means and indicates whether or not data designated by said address is held by the buffer storage means. In dependence on the outputs of the first and the second buffer directory means, the buffer storage means fetches the data as requested or stores the data in the third register means. In this way, the fetch request and the store request are distributed to the first buffer directory means and the second buffer directory means, whereby competition for access can be alleviated.

In a preferred embodiment of the present invention in which the virtual addresses are made use of, first and second address translation buffers for translating logical addresses into real addresses are provided in association with the first and the second register means, respectively.

The present invention will be apparent from the following detailed description taken in conjunction with the accompanying drawings, in which:

FIG. 2 is a block diagram showing a buffer storage control system according to an exemplary embodiment of the present invention;

Figure 1:
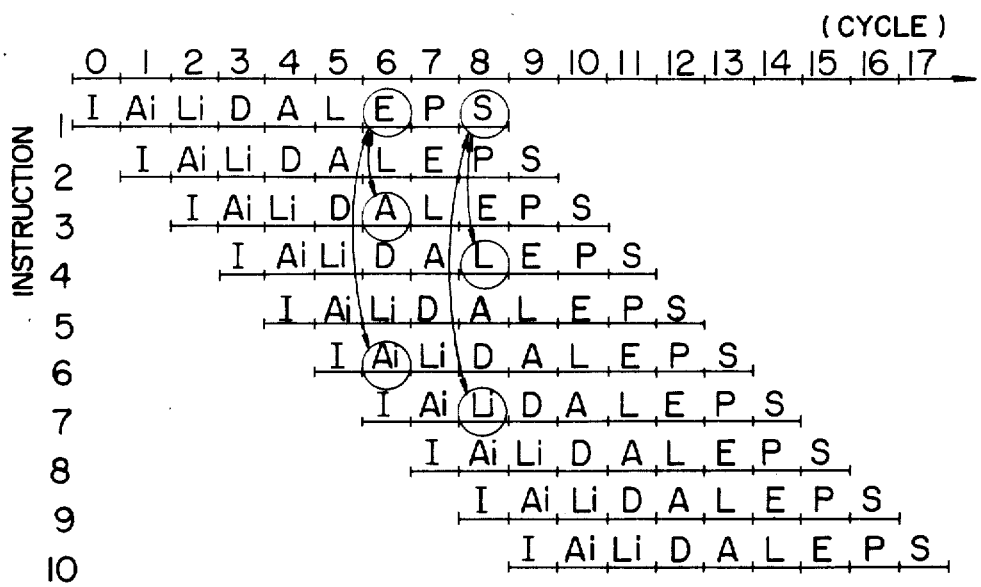
FIG. 1 is a view for illustrating a pipelined control in general.

Now, the present invention will be described in detail by referring to the drawings.

FIG. 2 shows in a block diagram a general arrangement of a buffer storage control system according to an embodiment of the invention. In FIG. 2, reference numerals 1 to 31 are used to designate bit positions of addresses while numerals greater than 40, inclusive, are used for denoting various components of the system.

Referring to FIG. 2, a logical address for fetch operations, i.e. instruction fetch or operand fetch is placed in a logical address register for a fetch operation (hereinafter also referred to as FLAR in abridgment) 40 from a processor not shown, while a logical address for store operation is placed in logical address register for store operation (hereinafter also referred to as SLAR) 50 from the processor. Each of these addresses consists of 31 bits as designated by 1 to 31. The logical address set in the FLAR 40 is supplied for accessing a translation look-aside buffer for fetch operation (hereinafter also referred to simply as FTLB) 41 which constitutes an address translation buffer for fetch operation and a buffer address array for fetch operation (hereinafter referred to as FBAA) 44 which constitutes a buffer directory for fetch operation. The FTLB41 has 512 columns in two rows. For selecting one of these columns, bits 11 to 19 of the address placed in the FLAR 40 is made use of as the column address. Each of the columns holds a plurality of two-address translation pairs each consisting of bits 1 to 10 of the logical address LA and bits 1 to 19 of the corresponding real address RA. The address translation pairs which are selected by bits 11 to 19 of the address placed in the FLAR 40 are read out. The bits 1 to 10 of the two logical addresses as read out are compared with the bits 1 to 10 of the FLAR 40 which do not constitute the aforementioned column address through comparators 42a and 42b, respectively. The outputs of the comparators 42a and 42b are supplied to a selector 43 which then outputs the real address corresponding to the logical address for which coincidence is detected from the aforementioned comparison. Accordingly, there makes appearance at the output of the selector 43 the real address corresponding to the logical address of the FLAR 40. When no coincidence is detected by the comparators 42a and 42b, a known address translation process in which an address translation table is made use of is activated. However, since the address translation process constitutes no part directly relevant to the subject of the present invention, any further description will be unnecessary.

The FBAA 44 comprises 64 columns in four rows. For selecting one of these columns, bits 20 to 25 of the address placed in the FLAR 40 are used. The FBAA 40 serves to hold bits 1 to 19 of the real address for the data held by a buffer storage (BS) 61 described hereinafter. Four real addresses are read out from the column of FBAA 44 selected by the bits 20 to 25 of the address set in the FLAR 40 and compared with the real address supplied from the selector 43 through comparators 45a, 45b, 45c and 45d, respectively. In case coincidence is found in any one of these comparisons, this means that the data required is present at a row of the buffer storage 61 which row corresponds to the row from which the real address resulting in coincidence in the comparison is read out. When no coincidence is detected at all in the comparisons made by the comparators 45a, 45b, 45c and 45d, a block transfer is carried out from a main storage not shown to the buffer storage 61 in a manner known per se. However, since such data transfer is irrelevant to the subject of the present invention, further description is omitted.

Simultaneously with the supply of the address bits from the FLAR 40 to the FTLB 41 and the FBAA 44 in the manner described above, the bits 20 to 28 of the same address are supplied to a buffer storage address register (hereinafter referred to as BSAR) 60 to thereby permit access to the buffer storage (BS) 61 in parallel with the accesses to the FTLB 41 and FBAA 44. The buffer storage or BS 61 is configured in four rows. Data of 8 bytes is read out from each of the rows of BS61 and supplied to a selector 62 which has other inputs supplied with the outputs of the comparators 45a, 45b, 45c and 45d, respectively. The selector 62 selects the 8-byte data which corresponds to the row for which coincidence has been detected in the comparisons made by the comparators 45a, . . . , 45d.

A logical address for store operation set at a logical address register for store operation (hereinafter referred to as SLAR) 50 is supplied for access to a translation look-aside buffer for store operation (hereinafter referred to as STLB) 51 which constitutes an address translation buffer for store operation and a buffer address array for store operation (hereinafter referred to as SBAA) 54 which constitutes a buffer directory for store operation. The STLB 51, comparators 52a and 52b, a selector 53, the SBAA 54 and comparators 55a to 55d are arranged in the same configuration as the FTLB 41 for fetch operation, the comparators 42a and 42b, the selector 43, the FBAA 44 and the comparators 45a to 45d to serve for the same functions. The contents held by the STLB 51 and the SBAA 54 are the same as those held by the FTLB 41 and FBAA 44. It should however be pointed out that while the FTLB 41, the FBAA 44 and the BS 61 are accessed in parallel with one another in the case of the fetch operation, the STLB 51 and the SBAA 54 are accessed in parallel and subsequently the BS 61 is accessed if the required data is present in the latter in the case of the store operation. The store data is set in a store data register or SDR 63. When a coincidence output is obtained from one of the comparators 55a to 55d, corresponding one of the gates 64a to 64d is opened to allow the data of 8 bytes set in the SDR 63 to be stored in the buffer storage or BS 61.

The buffer storage address register or BSAR 60 is supplied with a signal indicating which of the fetch and the store operations is requested by the processor not shown. When the request is either the fetch or the store request, the address of the address register 40 or 50 corresponding to the request is placed in the BSAR 60 to be supplied to the BS 61 as the column address. In case competition is brought about due to the simultaneous occurrence of both requests, the store request may be selected with preference over the fetch request, for example, whereby the store address of the SLAR 50 is set in the BSAR 60 to allow the store operation of the BS 61 to be initiated while the fetch operation is caused to wait until the next cycle. It goes without saying that the preference may alternatively be put on the fetch request, as the system in concern requires.

In case the address translation pairs and/or data as desired are not present in the address translation buffer and/or the buffer storage, the address translation pair and/or the data are stored in the address translation buffer and/or the buffer storage through a process known per se. In this case, one and the same address translation pair is stored in the FTLB and the STLB, while one and the same address is stored in the FBAA and SBAA. Since the FBAA and the SBAA serve as the directory for the buffer storage or BS, the contents of the FBAA and the SBAA must necessarily be identical with each other. However, the contents of the FTLB and the STLB need not always be identical, although control would otherwise be facilitated.

In the buffer storage control system described above in conjunction with FIG. 2, there are provided independently the address translation buffers and the buffer directories for the fetch and store operations, respectively. By virtue of this feature, the accesses to the address translation buffers and the buffer directories in the cycles E and A and $A_i$ for the fetch and the store operations illustrated hereinbefore by referring to FIG. 1 can be performed in parallel with each other without involving any competition. Of course, considering the fact that no more than one buffer storage or BS is provided, competition for the access to the BS among the cycles S, L and $L_i$ as described hereinbefore in conjunction with FIG. 1 can not be avoided. In this case, the competition for the access to the BS 61 can be avoided by delaying for one cycle the setting of the address for fetch operation in the FLAR 40.

Although two address translation buffers and buffer directories are provided for the fetch and the store operations, respectively, in the case of the embodiment of the invention described so far, the address translation buffers can of course be spared, when the real address is supplied as the address for access. In this case, the bits 1 to 19 of the real address set at the FLAR 40 are directly supplied to the comparators 45a to 45d. Same holds true for the SLAR 50. Further, in the case of a store instruction, the STLB 51 may be spared when a real address determined through a test fetch for detecting the access exception as performed in the cycle A is held until the cycle E. Mor particularly, there is known a data processing system of such a configuration in which the address translation buffer is accessed to perform a test fetch for detecting the access exception by making use of the cycle A. When the invention is applied to this kind of data processing system, an arrangement may be made such that the test fetch is performed by accessing the FTLB 41 with the logical address set in the SLAR 50, wherein the real address thus obtained is held until the cycle E at which the real address is applied to the comparators 55a to 55d in place of the output signal from the selector 53. Thus, the STLB 51 can be spared.

Further, the FTLB, the FBAA and the BS are operated in parallel with one another in the case of a fetch operation in the illustrated embodiment. However, it will be appreciated that the FTLB and the FBAA may be operated in parallel with each other with the BS being operated in dependence on the results of the parallel operations, as is the case of the store operation.

Figure 3:
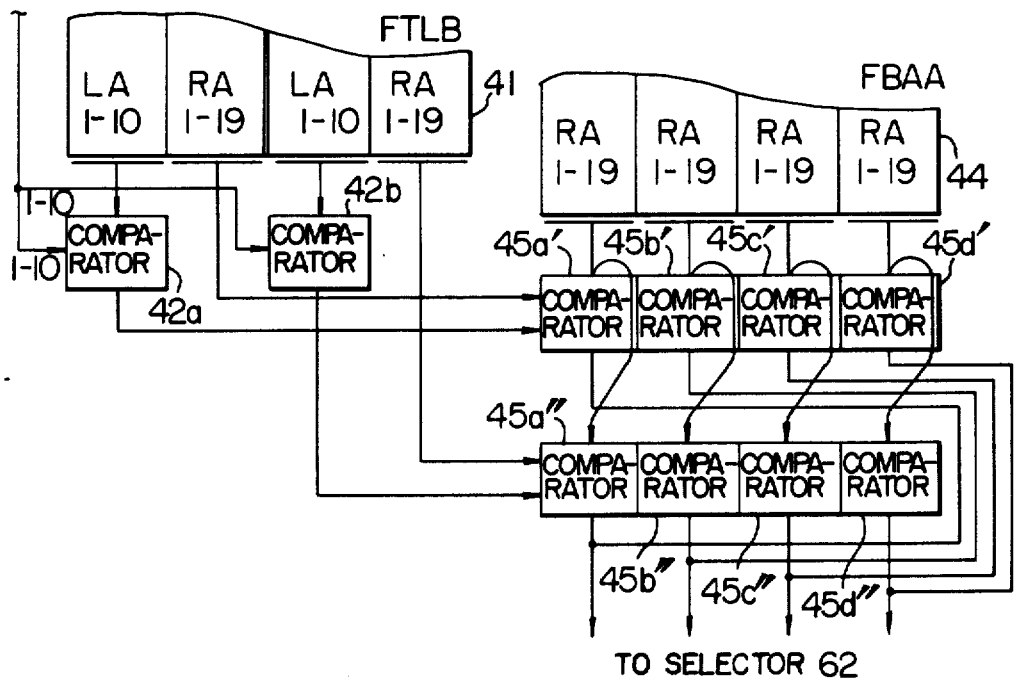
FIG. 3 shows in a block diagram a version of a portion of the buffer storage control system shown in FIG. 2.

FIG. 3 shows a buffer storage control system according to another embodiment of the invention which differs from the one shown in FIG. 2 in that a part of the latter is modified. More specifically, in the case of the embodiment shown in FIG. 3, the selector 43 is removed, while the comparators 45a to 45d are replaced by the comparators 45a' to 45d' and 45a" to 45d". The real address of one of the address translation pairs read out from the FTLB 41 is supplied to the comparators 45a' to 45d', while the real address of the other address translation pair is supplied to the comparators 45a" to 45d". Further, the output of the comparator 42a is coupled to the inputs of the compaarators 45' to 45d', while the output of the comparators 42b is applied to the comparators 45a" to 45d". The comparators 45a' to 45d' serve to compare the one real address read out from the FTLB 41 with four real addresses read out from the FBAA 44 to output the result of comparison in response to the coincidence output of the comparator 42a. Unless a coincidence output is produced by the comparator 42a, no coincidence output is produced by any one of the comparators 45a' to 45d'. The comparators 45a" to 45d" also operate in the similar manner. The outputs of the comparators 45a' to 45d' and 45a" to 45d" which correspond to each other are connected together and coupled to the selector 62. The logical operation of the system shown in FIG. 3 is same as the one shown in FIG. 2, although the circuit configuration differs from the latter. Needless to say, the configuration illustrated is also adopted at the output side of the STLB 51 and the SBAA 55. However, the outputs are coupled to the gates 64a to 64d.

Figure 4:
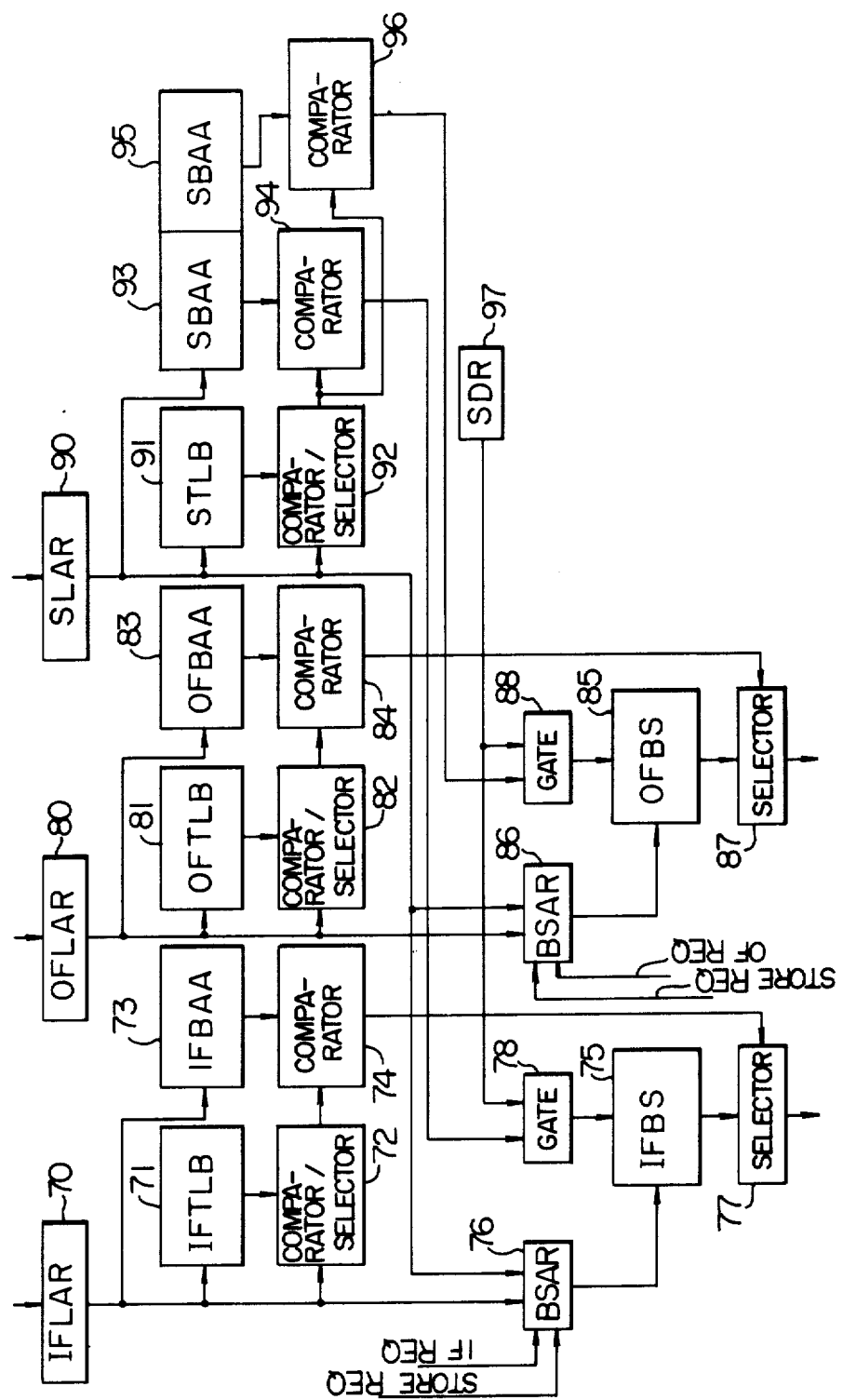
FIG. 4 is a block diagram showing another embodiment of the invention.

FIG. 4 shows another embodiment of the invention. The buffer sotrage control system shown in FIG. 4 is characterized in that the buffer storage BS is divided for the instruction fetch operation and the operand fetch operation, which is accompanied by the separate provisions of the address translation buffers for the instruction fetch and the operand fetch operations and the buffer directories for the instruction fetch and the operand fetch operations.

In the case of the embodiment shown in FIG. 4, the buffer storage or BS is divided into a buffer storage 75 for the instruction fetch (hereinafter referred to as IFBS) and a buffer storage 85 for the operand fetch (hereinafter referred to as OFBS). The address for the instruction fetch, the address for the operand fetch and the address for the store operation are placed, respectively, in a logical address register 70 for instruction fetch (hereinafter referred referred to as IFLAR), a logical address register 80 for operand fetch (hereinafter referred to as OFLAR) and a logical address register 90 for store operation (hereinafter referred to as SLAR). The translation look-aside buffer or TLB which constitutes the address translation buffer is composed of a TLB 71 for instruction fetch (hereinafter referred to as IFTLB), a TLB 81 for operand fetch (hereinafter referred to as OFTLB) and a TLB 91 for store operation (hereinafter referred to as STLB). These three buffers 71, 81 and 91 hold same contents, although they may be different from one to another TLB, as is the case of the embodiment shown in FIG. 2. Correspondingly, the buffer directory is composed of a buffer address array 73 for instruction fetch (hereinafter referred to as IFBAA), a buffer address array 83 for operand fetch (hereinafter referred to as OFBAA) and buffer address arrays 93 and 494 for store operation (hereinafter referred to as SBAA). The IFBAA 73 and the SBAA 93 hold the same content which is the address for the data held by the IFBS 75. Further, the OFBAA 83 and SBAA 95 hold the same content which represents the address for the data held by the OFBS 85.

Upon appearance of an instruction fetch request, the IFTLB 71, the IFBAA 73 and the IFBS 75 (by way of the BSAR 76) are accessed in parallel with one another with the aid of the address set in the IFLAR 70. When coincidence is found through the comparator/selector (72, 74), the data (instruction) as requested is read out through the selector 77.

Upon appearance of an operand fetch request, the OFTLB 81, the OFBAA 83 and the OFBS 85 (by way of the BSAR 86) are accessed in parallel with one another with the aid of the address set in the OFLAR 80. When coincidence is found through the comparator/selector (82, 84), the data (operand) as requested is read out through the selector 87.

In the case of a store request, the STLB 91 and the SBAAs 93 and 95 are accessed in parallel by the address placed in the SLAR 90. The output of the comparator 94 is applied to a gate 78 of the IFBS 75, while that of the comparator 96 is applied to a gate 88 of the OFBS 85. Thus, when coincidence is detected by both the comparator/selector 92 and the comparator 94, the gate 78 is enabled to allow the store data of the SDR 97 to be stored in the IFBS 75. On the other hand, when coincidence is detected by both the comparator/selector 92 and the comparator 96, the gate 88 is enabled to allow the store data of the SDR 97 to be stored in OFBS 85. Of course, there may arise such a case in which coincidence is detected by both comparators 94 and 96, whereby the store data is stored in both the BSs.

In the buffer storage control system shown in FIG. 3, competition between the instruction fetch and the operand fetch can be removed in addition to the advantages of the control system shown in FIG. 2.

What is claimed is:

1. A buffer storage control system, comprising:
    first register means in which an address for a fetch request is set;
    second register means in which an address for a store request is set;
    third register means in which data for a store operation is set;
    buffer storage means connected to said first, said second and said third register means for holding data;
    first buffer directory means connected to receive the address from said first register means for outputting a signal indicating whether or not data designated by said address is held by said buffer storage means; and
    second buffer directory means connected to receive the address from said second register means for outputting a signal indicating whether or not data designated by said address is held by said buffer storage means;
    wherein said buffer storage means includes means connected to said first buffer directory means and said second buffer directory means for fetching the data from said buffer storage means or for storing the data of said third register means in said buffer storage means in dependence on the outputs of said first and said second buffer directory means and the addresses of said first and second register means.

2. A buffer storage control system according to claim 1, wherein said first and second buffer directory means include, respectively, first and second hold means for holding the addresses of the data held by said buffer storage means.

3. A buffer storage control system according to claim 1, wherein said first directory means and said buffer storage means operate in parallel with each other in response to a fetch address supplied from said first register means.

4. A buffer storage control system according to claim 2, wherein said buffer storage means includes a buffer storage composed of blocks of M columns and N rows for holding data, respectively, and a part of the addresses set in said first and second register means is used as a column address for reading out the data from N blocks belonging to the column designated by said column address;
    said first and second hold means including, respectively, areas in M columns and N rows in correspondence with said buffer storage, wherein the addresses of the data placed in said blocks of said buffer storage are held in corresponding ones of said areas, said first and second hold means reading out the addresses from the N areas belonging to the column designated by said column address;
    said first buffer directory means including first comparison means for comparing a part of the address placed in said first register mean, which differs from the part of the address used as said column address, with the N addresses read out from said first hold means, thereby to indicate the row of said buffer storage in which the data for the address placed in said first register means is present;
    said second buffer directory means including second comparison means for comparing a part of the address placed in said second register means, which differs from the part of the address used as said column address, with the N addresses read out from said second hold means, to thereby indicate the row of said buffer storage in which the data for the address placed in said second register means is present;
    said buffer storage means including selector means which responds to said first comparison means to select the data present in the row indicated by said first comparison means among the data of the N blocks read out from said buffer storage for outputting said selected data; and said buffer storage means further including gate means which responds to said second comparison means for supplying the data placed in said third register means to said buffer storage to be stored at the row indicated by said second comparison means.

5. A buffer storage control system according to claim 4, wherein said first hold means and said buffer storage perform respective reading operations in parallel with each other in response to the fetch address set in said first register means.

6. A buffer storage control system according to claim 1, wherein each of said first and second register means stores a logical address, further comprising:

first address translation buffer means holding translation pairs each consisting of a logical address and a corresponding real address for translating the logical address placed in said first register means into a real address and second address translation buffer means holding translation pairs each consisting of a logical address and a corresponding real address for translating the logical address placed in said second register means into a real address;

said first buffer directory means being connected to receive the logical address from said first register means and the real address from said first address translation buffer means; and said second buffer directory means being connected to receive the logical address from said second register means and the real address from said second address translation buffer means.

7. A buffer storage control system according to claim 6, wherein said first address translation buffer means and said second address translation buffer means hold the identical translation pairs, respectively.

8. A buffer storage control system according to claim 6, wherein said first address translation buffer means, said first buffer directory means and said buffer storage means operate in parallel with one another in response to the logical address for a fetch operation placed in said first register means.

9. A buffer storage control system according to claim 8, wherein said second address translation buffer means and said second buffer directory means operate in parallel with each other in response to the logical address for a store operation placed in said second register means.

10. A buffer storage control system according to claim 6, wherein said first and second buffer directory means include, respectively, first and second hold means for holding the real addresses for the data held by said buffer storage means.

11. A buffer storage control system according to claim 10, wherein said first address translation buffer means includes a first translation look-aside buffer having areas in K columns and L rows, each of said areas holding said translation pair, said first translation look-aside buffer reading out the L translation pairs which belong to the column designated by a column address constituted by a part of the logical address set in said first register means;

said first address translation buffer means further including third comparison means for comparing a part of the logical address of said first register means which does not overlap said column address with the logical addresses of the L translation pairs read out from said first translation look-aside buffer;

said second address translation buffer means including a second translation look-aside buffer having areas in K columns and L rows, each of said areas holding said translation pair, said second translation look-aside buffer reading out the L translation pairs which belong to the column designated by a column address constituted by a part of the logical address of said second register means;

said second address translation means further including fourth comparison means for comparing a part of the logical address of said second register means which does not overlap said column address with the logical addresses of the L translation pairs read out from said second translation look-aside buffer;

said buffer storage means including a buffer storage composed of blocks arrayed in M columns and N rows, each of said blocks holding data, wherein the data of the N blocks designated by a column address constituted by parts of the logical addresses placed in said first and second registers are read out;

said first and second hold means including, respectively, areas arrayed in M columns and N rows in correspondence to said buffer storage, each of said areas holding the real address of the data placed in the corresponding block of said buffer storage, said first and second hold means reading out the real addresses from the N areas belonging to the column designated by said column address;

said first buffer directory means including first comparison means, wherein said first comparison means compares the real address supplied from said first translation look-aside buffer with the real addresses supplied from said first hold means and responds to said third comparison means thereby to indicate the row of said buffer storage in which data for the logical address placed in said first register means is present;

said second buffer directory means including second comparison means, wherein said second comparison means compares the real address supplied from said second translation look-aside buffer with the real addresses supplied from said second hold means and responds said fourth comparison means thereby to indicate the row of said buffer storage in which data for the logical address placed in said second register means is present;

said buffer storage means including selector means which responds to the output of said first comparison means to select the data present in the row indicated by said first comparison means among the data of the N blocks read out from said buffer storage for outputting said selected data; and said buffer storage further including gate means which responds to said second comparison means for supplying the data placed in said third register means to said buffer storage to be stored at the row indicated by said second comparison means.

12. A buffer storage control system according to claim 11, wherein said first translation look-aside buffer, said first hold means and said buffer storage operate in parallel with one another in response to the logical address for a fetch operation placed in said first register means.

13. A buffer storage control system according to claim 12, wherein said second translation look-aside buffer and said second hold means operated in parallel with each other in response to the logical address for a store operation placed in said second register means.

14. A buffer storage control system according to claim 1, wherein said first register means includes fourth register means for storing an address for an instruction fetch request and fifth register means for storing an address for an operand fetch request;

said buffer storage means including first buffer storage means and second buffer storage means;

said first buffer directory means including third and fourth buffer directory means, wherein said third buffer directory means is supplied with the address from said fourth register means to produce as the output a signal indicating whether or not the data designated by said address is held by said first buffer storage means, while said fourth buffer directory means is supplied with the address from said fifth register means to produce an output signal indicating whether or not the data designated by said address from said fifth register means is held by said second buffer storage means;

said second buffer directory means including fifth and sixth buffer directory means, wherein said fifth buffer directory means is supplied with the address from said second register means to produce an output signal indicating whether or not the data designated by said address is held by said first buffer storage means, while said sixth buffer directory means is supplied with the address from said second register means to produce an output signal indicating whether or not the data designated by said address of said second register means is held by said second storage means;

said first buffer storage means further including means for fetching the data from said first buffer storage means or storing the data of said third register means in said first buffer storage means in dependence on the output signals of said third and fifth buffer directory means and the addresses placed in said fourth and second register means; and said second buffer storage means further including means for fetching the data from said second buffer storage means or storing the data of said third register means in said second buffer storage means in dependence on the output signals of said fourth and sixth buffer directory means and the addresses placed in said fifth and second register means.

15. A buffer storage control system according to claim 14, wherein said third and fifth buffer directory means include, respectively, third and fifth hold means for holding the addresses for the data held by said first buffer storage means, while said fourth and sixth buffer directory means include, respectively, fourth and sixth hold means for holding the addresses for the data held by said second buffer storage means.

16. A buffer storage control system according to claim 14, wherein said third buffer directory means and said first buffer storage means operate in parallel with each other in response to the address placed in said fourth register means, while said fourth buffer directory means and said second buffer storage means operate in parallel with each other in response to the address placed in said fifth register means.

17. A buffer storage control system according to claim 14, wherein said fourth, fifth and second register means store respective logical addresses, further including:

third, fourth and fifth address translation buffer means for holding address translation pairs each consisting of a logical address and a corresponding real address, respectively, said third address translation buffer means serving for translating the logical address placed in said fourth register into a corresponding real address, said fourth address translation buffer means serving for translating the logical address placed in said fifth register means into a corresponding real address, and said fifth address translation buffer means serving for translating the logical address placed in said second register means into a corresponding real address;

said third buffer directory means being supplied with the logical address from said fourth register means and the real address from said third address translation buffer means;

said fourth buffer directory means being supplied with the logical address from said fifth register means and the real address from said fourth address translation buffer means; and said fifth and sixth buffer directory means being supplied with the logical address from said second register means and the real address from said fifth address translation buffer means.

18. A buffer storage control system according to claim 17, wherein said third, fourth and fifth address translation buffer means hold the identical translation pairs, respectively.

19. A buffer storage control system according to claim 18, wherein said third address translation buffer means, said third buffer directory means and said first buffer storage means operate in parallel with one another in response to the logical address for an instruction fetch placed in said fourth register;

said fourth address translation buffer means, said fourth buffer directory means and said second buffer storage means operate in parallel with one another in response to the logical address for an operand fetch placed in said fifth register; and said fifth address translation buffer means and said fifth and sixth buffer directory means operate in parallel in response to the logical address for a store operation placed in said second register means.

20. A buffer storage control system according to claim 17, wherein said third and fifth buffer directory means include, respectively, third and fifth hold means for holding the real addresses of the data held by said first buffer storage means, while said fourth and sixth buffer directory means include, respectively, fourth and sixth hold means for holding the real addresses of the data held by said second buffer storage means.

21. A buffer storage control system according to claim 20, wherein said third, fourth and fifth address translation buffer means include, respectively, third, foruth and fifth translation look-aside buffers each having areas in K columns and L rows, each of said areas holding said translation pair, each of said translation look-aside buffers reading out the L translation pairs which belong to the column designated by a column address constituted by part of the logical address of the corresponding register means;

said third address translation buffer means further including fifth comparison means for comparing a part of the logical address of said fourth register means which does not overlap said column address with the logical addresses of the L translation pairs read out from said third translation look-aside buffer;

said fourth address translation means further including sixth comparison means for comparing a part of the logical address of said fifth register means which does not overlap said column address with the logical addresses of the L translation pairs read out from said fourth translation look-aside buffer;

said fifth address translation buffer means further including seventh comparison means for comparing a part of the logical address of said seocnd register means which does not overlap said column address portion with the logical addresses of the L translation pairs read out from said fifth translation look-aside buffer;

said first and second buffer storage means including, respectively, first and second buffer storages each composed of blocks arrayed in M columns and N rows, each of said blocks holding data, wherein the data of the N blocks is designated by a column address constituted by a part of the logical address placed in the corresponding register;

said third, fourth, fifth and sixth hold means including, respectively, areas arrayed in M columns and N rows;

said third and fifth hold means holding at the respective areas the real addresses of the data stored in the corresponding blocks of said first buffer storages, and reading out the real addresses from the N areas belonging to the column designated by said column address;

said fourth and sixth hold means holding the real addresses of the data stored in the corresponding blocks of said second buffer storage, and reading the real addresses from the N areas belonging to the column designated by said column address;

said third, fourth, fifth and sixth buffer directory means including, respectively, eighth, ninth, tenth and eleventh comparison means;

said eighth comparison means comparing the real address supplied from said third translation look-aside buffer with the real addresses supplied from said third hold means and responding to the result of the comparison performed by said fifth comparison means thereby to indicate the row of said first buffer storage in which data for the logical address placed in said fourth register means is present;

said ninth comparison means comparing the real address supplied from said fourth translation look-aside buffer with the real addresses supplied from said fourth hold means and responding to the result of the comparison performed by said sixth comparison means thereby to indicate the row of said second buffer storage in which data for the logical address placed in said fifth register means is present;

said tenth comparison means comparing the real address supplied from said fifth translation look-aside buffer with the real addresses supplied from said fifth hold means and responding to the result of the comparison performed by said seventh comparison means thereby to indicate the row of said first buffer storage in which data for the logical address placed in said second register means is present;

said eleventh comparison means comparing the real address supplied from said fifth translation look-aside buffer with the real addresses supplied from said sixth hold means and responding to the result of the comparison performed by said seventh comparison means thereby to indicate the row of said second buffer soorage in which data for the logical address placed in said second register means is present;

said first buffer storage means including first selector means which responds to the output of said eighth comparison means to select the data present in the row indicated by said eighth comparison means among the data of the N blocks read out from said first buffer storage for outputting said selected data as the fetch instruction;

said first buffer storage means further including first gate means which responds to said tenth comparison means for supplying the data placed in said third register means to said buffer storage to be stored at the row indicated by said tenth comparison means;

said second buffer storage means including second selector means which responds to the output of said ninth comparison means to select the data present in the row indicated by said ninth comparison means among the data of the N blocks read out from said second buffer storage for outputting said selected data as the fetch operand; and said second buffer storage means further including second gate means which responds to said eleventh comparison means for supplying the data placed in said third register means to said buffer storage means to be stored at the row indicated by said eleventh comparison means.

22. A buffer storage control system according to claim 21, wherein said third translation look-aside buffer, said third hold means and said first buffer storage means operate in parallel in response to the logical address for the instruction fetch request placed in said fourth register means;

said fourth translation look-aside buffer, said fourth hold means and said second buffer storage means operate in parallel in response to the logical address for the operand fetch request placed in said fifth register means; and said fifth translation look-aside buffer and said fifth and sixth hold means operate in parallel in response to the logical address for the store operation placed in said second register means.

* * * * *